(12) United States Patent
Buerer

(10) Patent No.: US 8,154,154 B2
(45) Date of Patent: Apr. 10, 2012

(54) AUTOMATIC SWITCH CONFIGURATION

(75) Inventor: David Buerer, Beaverton, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 173 days.

(21) Appl. No.: 12/539,453

(22) Filed: Aug. 11, 2009

(65) Prior Publication Data

US 2011/0037323 A1 Feb. 17, 2011

(51) Int. Cl.
*H01H 47/00* (2006.01)
(52) U.S. Cl. .................. 307/132 EA; 307/116
(58) Field of Classification Search .................. 307/116, 307/132 EA
See application file for complete search history.

(56) References Cited

U.S. PATENT DOCUMENTS

| | | | |
|---|---|---|---|
| 3,678,291 A | 7/1972 | Coe | |
| 4,287,468 A | 9/1981 | Sherman | |
| 4,296,449 A | 10/1981 | Eichelberger | |
| 4,829,457 A | 5/1989 | Russo et al. | |
| 5,335,135 A | 8/1994 | Kinney | |
| 5,625,276 A | 4/1997 | Scott et al. | |
| 5,717,585 A | 2/1998 | Nguyen et al. | |
| 5,930,104 A | 7/1999 | Kadah et al. | |
| 6,188,181 B1 | 2/2001 | Sinha et al. | |
| 6,233,132 B1 | 5/2001 | Jenski | |
| 6,456,511 B1 | 9/2002 | Wong | |
| 6,525,918 B1 | 2/2003 | Alles et al. | |
| 7,015,682 B2 | 3/2006 | Santin et al. | |
| 7,119,456 B2 * | 10/2006 | Rouleau | 307/10.1 |
| 7,236,338 B2 | 6/2007 | Hale et al. | |
| 7,304,828 B1 | 12/2007 | Shvartsman | |
| 7,512,577 B2 * | 3/2009 | Slemmer et al. | 706/47 |
| 7,715,168 B2 * | 5/2010 | Gofman et al. | 361/160 |
| 2004/0169987 A1 | 9/2004 | Green | |

FOREIGN PATENT DOCUMENTS

WO WO9010942 A1 9/1990

OTHER PUBLICATIONS

Low Voltage Switches Product Specification Bulletin, Leviton Mfg. Co., Inc., Bulletin No. G-7088A/E4-tp, Tualatin, Oregon, 2004.
OSP Power Pack/OSA Add-A-Relay (OSP/OSA) Power Pack Series Product Specification Bulletin, Leviton Mfg. Co., Inc., Bulletin No. G-6987G/H4-TP, Little Neck, New York, 2005.

* cited by examiner

*Primary Examiner* — Robert L. Deberadinis
(74) *Attorney, Agent, or Firm* — Marger Johnson & McCollom PC

(57) ABSTRACT

A system including an input and a controller. The input is configured to receive a switch signal from multiple different types of switches. The controller coupled to the input and can determine the type of the switch by an analysis of the switch signals received from the switch through the input.

24 Claims, 4 Drawing Sheets

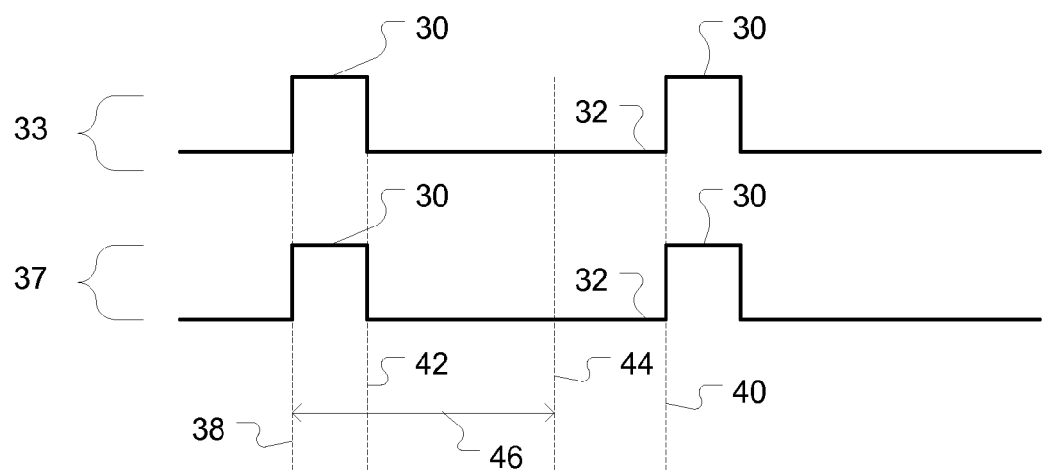
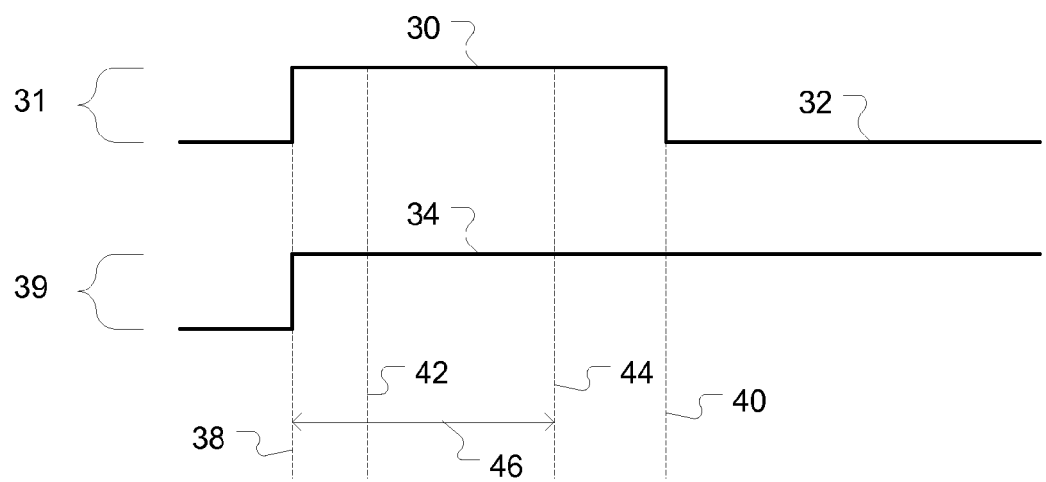

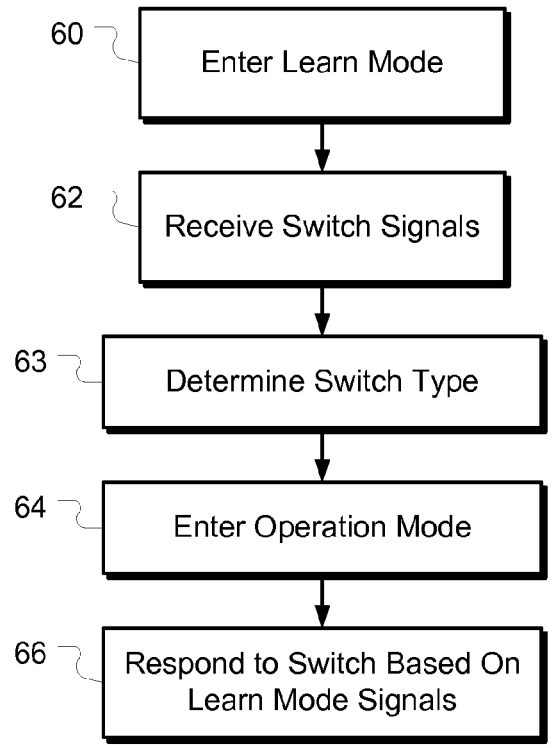
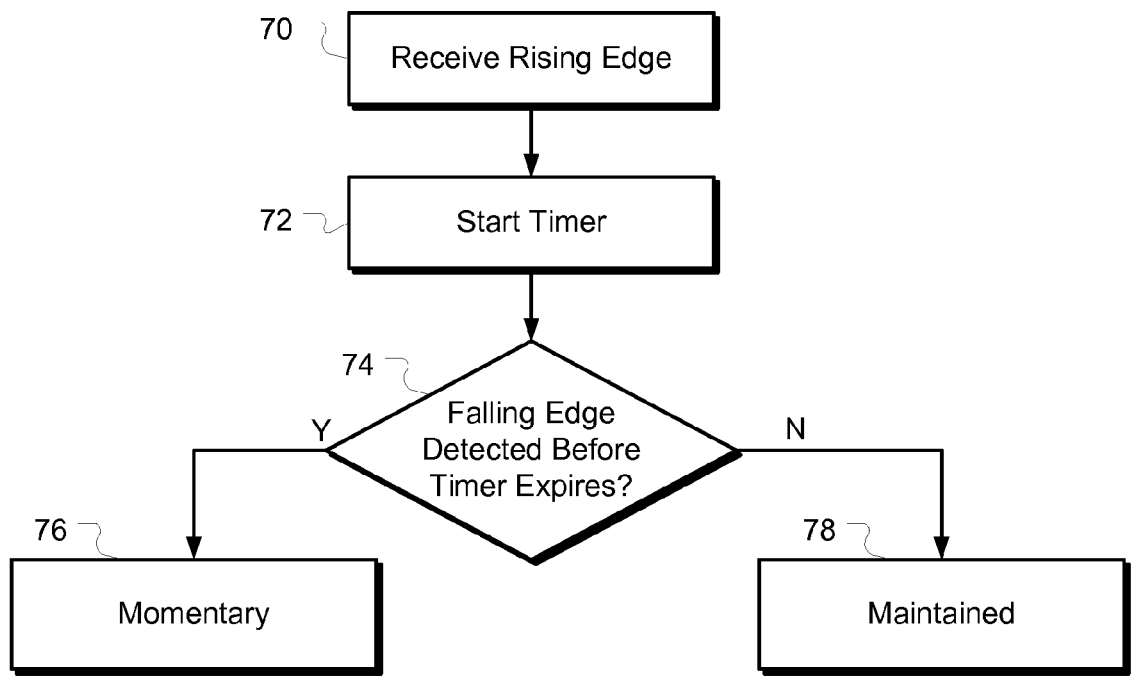

AUTOMATIC SWITCH CONFIGURATION

BACKGROUND

A switch can be used as an input to control an electrical load. The switch can generate a signal to indicate its state. For example, with a momentary switch, when the switch is pressed, the switch can close, pulling a signal line high. When the switch is released, the switch can open so that the signal line can be pulled low. Thus, when the momentary switch is pressed and released, the switch signal generated can be a pulse. In another example, with a maintained switch, the switch can be in only one of two states, opened or closed. As a result, the switch signal can be a steady state high or low. Accordingly, different signal states and/or transitions can occur for a single actuation for different switch types.

Controllers that respond to these switches have configuration controls such as jumpers, dual-inline-position (DIP) switches, or the like to configure the responsiveness of the controller. That is, the controller is manually set according to the particular switch type. As some controllers can respond to hundreds of switches, hundreds of switch types may need to be manually set for proper operation.

BRIEF DESCRIPTION OF THE DRAWINGS

FIGS. 2-5 are timing diagrams illustrating switch signals from switches of different types and load states according to some inventive principles of this patent disclosure.

FIG. 8 is a flowchart illustrating determining a switch type during a learn mode according to some inventive principles of this patent disclosure.

FIG. 9 is a flowchart illustrating another interpretation of a switch signal according to some inventive principles of this patent disclosure.

DETAILED DESCRIPTION

Figure 1:
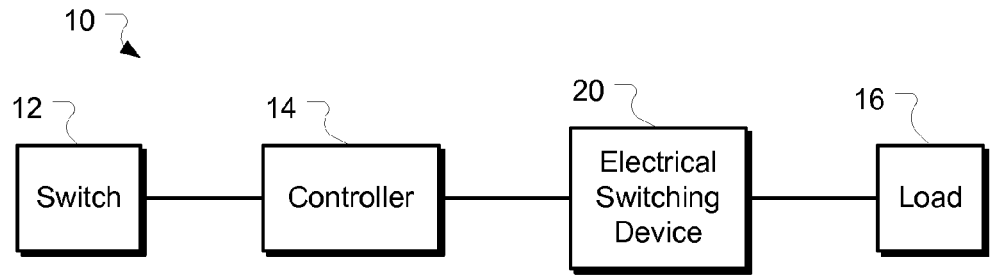
FIG. 1 is a block diagram of an automatic switch configuration system according to some inventive principles of this patent disclosure.

FIG. 1 is a block diagram of an automatic switch configuration system according to some inventive principles of this patent disclosure. In this embodiment, the system 10 includes a switch 12, a controller 14 and a load 16. The controller 14 includes an input coupled to the switch 12. The controller 14 is configured to receive a switch signal from the switch 12. In response, the controller 14 is configured to control the load 16.

A load 16 can be any variety of electrical loads. For example, the load 16 can be a light, a fan, an outlet, or any other electrical load type or circuit. The load 16 can also represent a digital control network where control status from the controller 14 can be presented to the network. That is, instead of controlling one or more loads directly, the control status can be transmitted through the digital control network to other loads, other controllers, or the like.

The controller 14 can be configured to control an on/off state of the load 16, an intensity of the load 16, or the like. The load 16 can be multiple electrical loads. The controller 14 can be configured to create a lighting scene, toggle a lighting scene, or the like. Thus, control of the load 16 can, but need not, mean applying or removing power to the load 16. The controller 14 can be configured to control any aspect of the load 16 in response to the switch 12.

The controller 14 can include a processor or processors such as digital signal processors, programmable or non-programmable logic devices, microcontrollers, application specific integrated circuits, state machines, discrete circuitry or the like. The controller 14 can also include additional circuitry such as memories, input/output buffers, transceivers, analog-to-digital converters, digital-to-analog converters, or the like. In yet another embodiment, the controller 14 can include any combination of such circuitry. Any such circuitry and/or logic can be used to implement the controller 14 in analog and/or digital hardware, software, firmware, etc., or any combination thereof.

In an embodiment, the controller 14 can be configured to determine a type of the switch 12. For example, the controller 14 can make a determination of whether the switch 12 is a momentary switch or a maintaining switch. A momentary switch can include a switch that remains in a particular state substantially only when actuated. That is, in a resting state, the momentary switch can be in a first state. When actuated, the momentary switch can enter a second state. Once the actuation is removed, the momentary switch can return to the first state. In contrast, with a maintained switch, the state of the switch will remain after an actuation is applied until a subsequent actuation is applied. That is, the state will be maintained until the maintained switch is actuated again.

As will be described in further detail below, the controller 14 can be configured to determine a switch type and use that switch type in the interpretation of the switch signals from the switch 12. However, the controller 14 can also be configured to act upon the switch signals without determining the switch type. Regardless, the controller 14 can, but need not, be aware of the type of the switch 12. That is, a jumper, DIP switch, software configuration, or other technique initiated by a user need not be set to inform the controller 14 about the type of switch. In another example, an installed switch 18 can be replaced with a different type without reconfiguring the controller 14. Thus, an installation time, retrofit time, configuration time, or the like can be reduced.

In an embodiment, the controller 14 can be coupled to an electrical switching device 20. As illustrated, the electrical switching device 20 is separate from the controller 14. For example, the controller 14 can be included in a control board for a relay panel. The relay panel can have multiple electrical switching devices 20 that are coupled to the control board and responsive to the controller 14. However, in another embodiment, the electrical switching device 20 can be included in the controller 14.

Moreover, although the controller 14 has been illustrated as coupled to a single switch 12, the controller 14 can be coupled to any number of switches. For example, the controller 14 can include multiple inputs for multiple switches 12. Furthermore, any number or combination of loads 16 can be controlled in response to any number of switches 12.

The electrical switching device 20 can include an air-gap relay, solid state relay, or other switch based on SCRs, triacs, transistors, etc. The electrical switching device 20 may provide power switching in discrete steps such as on/off switching, with or without intermediate steps, continuous switching such as dimming control, multi-level switching, or the like.

Although the electrical switching device 20 has been given as an example of a control of a load 16, the system need not be capable of controlling a load. For example, in an embodiment, the system can include a controller 14 that is configured to interpret the switch signal in response to the switch type, disregard state changes of the switch signal in interpreting the switch signal, or the like. The interpreted switch signal can then be used by another controller, further processed, or the like. That is, the controller 14 can generate an interpreted switch signal from a received switch signal. The interpretation of the switch signal can be performed by the controller 14 to provide an interpreted switch signal in a generic format, a format suitable for subsequent processing, or the like.

Figure 2:
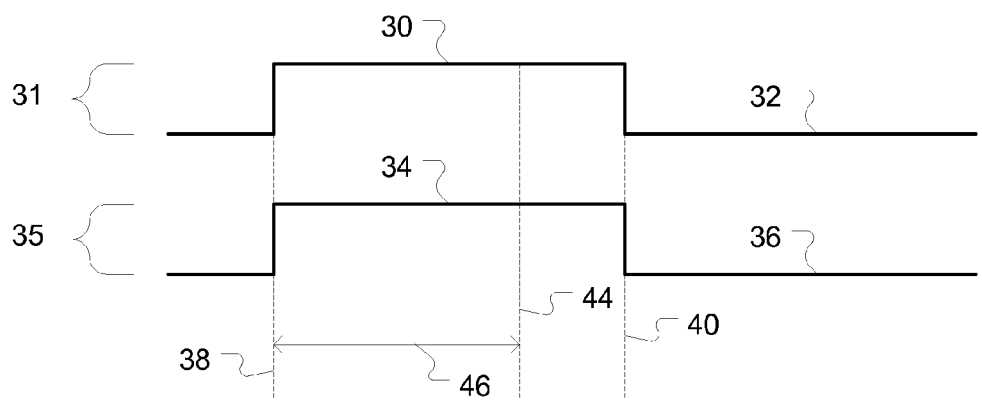

FIGS. 2-5 are timing diagrams illustrating switch signals from switches of different types and load states according to some inventive principles of this patent disclosure. In FIGS. 2-5, a signal from a maintained switch or a signal from a momentary switch is illustrated in reference to an actuation of a load under various conditions. In FIG. 2, signal 31 represents a signal from a maintained switch. The maintained switch can be toggled between states 30 and 32. Signal 35 represents an actuation of a load 16 between states 34 and 36. Although two states 34 and 36 are illustrated for the load 16, as described above, since the load 16 can be any variety of load, the switching can be among any variety of states, e.g. on/off states, multi-level states, or the like.

In an embodiment, the maintained switch is actuated at time 38. The state of the switch signal 31 will change to state 30. In response, the load 16 can be changed to state 34. At time 40 the maintained switch is actuated again, changing the switch signal 31 to state 32. In response, the load 16 can be changed to state 36.

Figure 3:
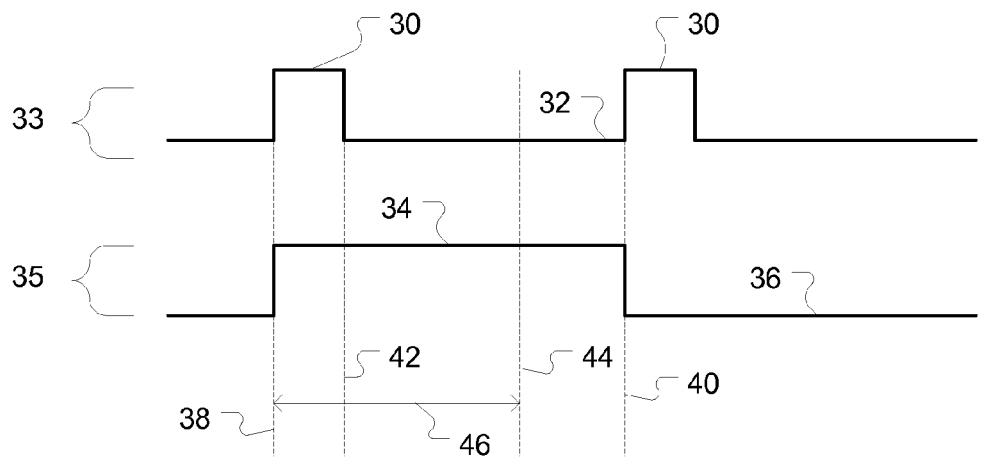

In contrast, in FIG. 3, signal 33 represents a signal from a momentary switch. When the momentary switch is actuated at time 38, the switch signal 33 enters state 30, but only remains in state 30 until time 42 when the actuation is removed. That is, at time 42 the switch signal 33 changes to state 32. At time 40, the momentary switch is actuated again. Accordingly, the switch signal 33 changes to state 30. When the actuation is removed again, the state changes back to state 32. In response to the first actuation at time 38, the load 16 changes to state 34, similar to the response to the maintained switch as illustrated in FIG. 2. In response to the second actuation at time 40, the load 16 changes to state 36, again similar to the response to the maintained switch as illustrated in FIG. 2.

In an embodiment, the load state 35 can represent a desired state of the load 16. Thus, regardless of the switch type, the load 16 can be actuated as desired. That is, with a first actuation of the switch at time 38, regardless of the switch type, the state is changed to the desired state 34. With the second actuation at time 40, again regardless of the switch type, the state is changed to the desired state 36.

In an embodiment, time 46 can be used in determining the switch type, properly processing the switch signals, or the like. For example, time 46 can be the time between a first state change at time 38 and time 44. The time 46 can be selected to be between expected transitions based on the switch type. For example, when in normal use, a momentary switch may be actuated for about 0.5 seconds. That is, the time that the switch signal 33 is in state 30 may be about 0.5 seconds. Similarly, a maintained switch may be actuated for 2 seconds or more. In an embodiment, the time 46 can be selected based on such expectations. For example, the time 46 can be selected such that time 44 would be between state changes for the different switch types based on an initial state change at time 38. As will be described in detail below, the time 46 can be used in a variety of ways to determine the switch type, processing the switch signals, or the like.

In an embodiment, the momentary and maintained switches can be configured to pull up a line coupled to the controller 14. Thus, the state 32 can be a ground state and the state 30 can be pulled up to 24 VDC, for example. However, the states 30 and 32 can represent other levels. Moreover, in an embodiment, switches, switch signals, or the like need not change back to the same state. That is, changing to the state 30 need not be followed by the state 32. Such states are used merely as illustration of an example of controlling the load 16.

FIGS. 4 and 5 are timing diagrams illustrating switch signals from switches of different types and load states according to some inventive principles of this patent disclosure. In particular, in FIGS. 4 and 5, the load states can represent different responses to a received switch signal that corresponds to a switch type different from an expected switch type. For example, in FIG. 4, the expected switch type can be a maintained switch. However, the switch signal 33 received can be generated by a momentary switch similar to FIG. 3. Load state 37 represents a state of the load 16 if the maintained switch signal is expected, but a momentary switch type signal is received. The load can enter the desired state 34 at time 38 but change to the state 36 as illustrated at time 42. A similar pulse can occur after time 40. As a result, the control of the load is pulsed, rather than changing state.

Similarly, as illustrated in FIG. 5, if a maintained switch signal 31 is received when a momentary signal is expected, the load state 39 can enter state 34 at time 38 and, with the illustrated inputs, never leave the state 34. Although FIGS. 4 and 5 can represent control of a load where the response to the switch signal is improperly configured, as will be described in further detail below, a controller 14 can be configured to determine a switch type, then respond to the switch signal according to that switch type, even if the switch type represented by a current switch signal is apparently different. That is, in an embodiment, the switch type can be determined earlier, and the load 16 can be controlled later regardless of the apparent switch type. However, as will also be described in further detail below, a variety of techniques can be used to accept the signal from either switch type, yet result in the desired operation.

Figure 6:
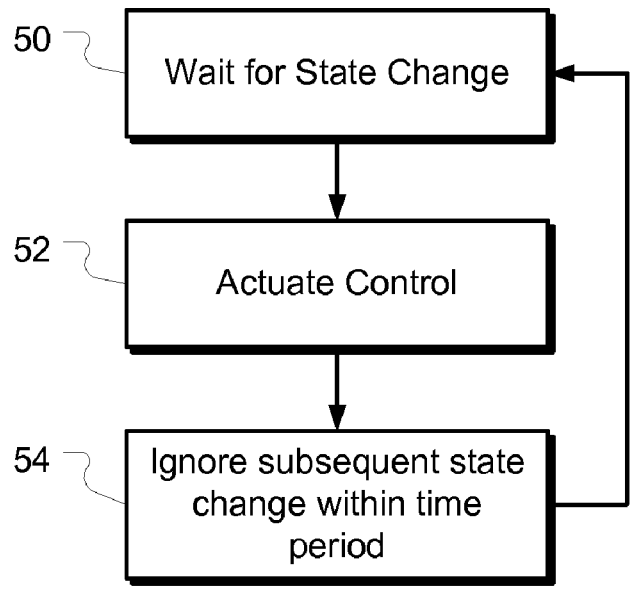
FIG. 6 is a flowchart illustrating an interpretation of a switch signal according to some inventive principles of this patent disclosure.

FIG. 6 is a flowchart illustrating an interpretation of a switch signal according to some inventive principles of this patent disclosure. With this technique, the switch type can, but need not be used. For example, in 50 the system waits for a state change. When a state change is received, the control is actuated. As used herein the actuation of the control represents any change in state, use of the input or the like. As described above, the controller 14 can be configured to control a variety of aspects of a load 16. The actuation of the control includes the actuation of the control of the load 16. For example, the actuation of the control in FIG. 2 occurred both at time 38 and time 40. That is, the FIG. 2, the actuation of the load 16 was a change of state. However, the actuation can be other effects. For example, the actuation can include a change in a dimming level, an input to a multi-way switching scheme, or the like. Hence, the actuation of the control in 52 can, but need not change the state of a load 16.

After the control is actuated in 54, subsequent state changes for a time period can be ignored, disregarded, or the like. Referring back to FIG. 3, the time period 46 can be used. That is, a subsequent state change before time 44 can be disregarded. For example, in an embodiment, a time between the state change received in 50 and a subsequent state change can be measured. If the time is greater than or equal to the time 46, the state change can be processed as usual. However if the time is less than time 46, the state change can be ignored.

Referring to FIGS. 2 and 3, for either switch type, at time 38 a state change occurs. The momentary switch signal 33 also has a state change at time 42. This state change can be ignored as it occurred before the time 44. However, the state changes for either type can be processed at time 40 as time 40 is after time 44. Thus, the desired actuation of the load can be obtained regardless of the switch type.

In an embodiment, all state changes between the initial state change and the end of the time period can be ignored. Thus, any actuation of a momentary switch after the state change at time 38, but before the time 44 can be disregarded.

However, in another embodiment, only the first subsequent state change can be ignored. That is, the first transition from state 30 to state 32 of the momentary switch signal 33 can be ignored. As a result, another subsequent state change can be acted upon, even though the state change occurs prior to the time 44. Thus, the momentary switch can be actuated faster than if any response had to wait until time 44. That is, the trailing state change of a single actuation of the momentary switch is ignored, allowing for a new state change from a new actuation to be processed.

Figure 7:
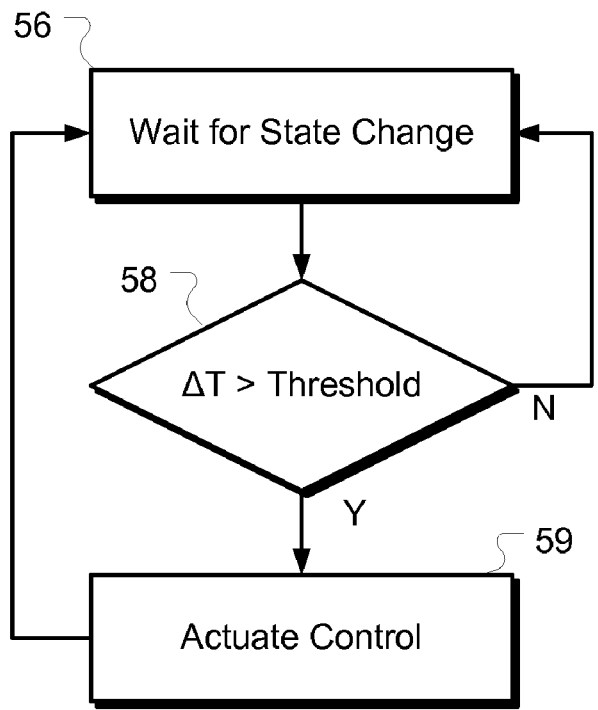
FIG. 7 is a flowchart illustrating another interpretation of a switch signal according to some inventive principles of this patent disclosure.

FIG. 7 is a flowchart illustrating another interpretation of a switch signal according to some inventive principles of this patent disclosure. In this embodiment, if a time period has not elapsed, any state changes are ignored. For example, in 56, the flow waits for a state change. When a state change is received, a check is made in 58 to determine if the time period has passed. If not, the flow returns to 56 to wait for another state change.

If the time period has passed, then the control can be actuated in 59. Accordingly, the time period is reset, beginning with the most recent state change. For example, referring back to FIGS. 2 and 3, the state change that occurs at time 38 is the initial state change for the time period. Any other state changes that occur before time 44 are disregarded.

Of particular note with respect to an embodiment is that no state changes for the maintained switch type are expected to be received. A maintained switch may be actuated to change to state 30 then back to state 32, approximating a momentary switch. However, the time 44 can be selected such that in normal operation, the time 44 is between the normal on/off time of a momentary switch, and the predicted on time or predicted off time for a maintained switch.

Similar to the maintained switch, the momentary switch can be actuated such that the transition from state 30 to state 32 occurs after time 44. For example, the momentary switch can be pressed and held. The transition to state 32 may not occur until the momentary switch is released. If sufficient time has passed, as described above, the change in state of the release can be processed as another actuation for the load. Thus, with the above techniques, a momentary switch and/or a maintained switch can have different functionality.

FIG. 8 is a flowchart illustrating determining a switch type during a learn mode according to some inventive principles of this patent disclosure. In an embodiment, a switch type can be determined in a learn mode. In 60, a learn mode can be entered. For example, the switch 12 can be actuated in a particular pattern. In another example, a control in a relay cabinet can be actuated. In yet another example, the learn mode can be entered automatically. Regardless, the controller 14 can enter the learn mode.

In the learn mode, switch signals can be received in 62. The switch signals can be generated in a variety of ways. For example, the switch 12 can be actuated according to instructions provided by the controller 14, a manual, an industry standard, or the like. In another embodiment, the switch signals can be substantially random.

The switch signals can indicate the type of the switch 12. For example referring back to FIG. 2, if a series of pulses is received, with a low duty cycle, the switch 12 may be a momentary switch. If longer pulses are received, the switch 12 may be a maintained switch. That is, the switch type can be determined in 63 in response to at least one state change of the switch signal. In an embodiment, the controller 14 can be configured to receive the switch signals and interpret them to determine the switch type. In 64, the operation mode can be entered. That is, the learn mode is exited. Accordingly, the controller 14 can respond to the switch 12 based on the switch type.

In an embodiment, the controller 14 may treat the switch 12 as a particular type even if the controller receives other signals indicating that the switch 12 is a different type. That is, the switch type may be changed only in the learn mode, for example. Thus, even though a switch type has been determined, the switch type need not be continuously changed. As a result, operation similar to that described with respect to FIGS. 4 and 5 can occur.

In another embodiment, the controller 14 can be configured to redefine the switch type in response to switch signals received during the operation mode. For example, after a first set of switch signals indicates a different switch type, the controller 14 can be configured to change the defined switch type. In another example, a number of switch signals indicating a different type need to be received before the controller 14 will change the definition of the switch type. That is, the controller 14 can be configured to wait for confirmation that the operation of switch did not merely appear as a different switch type.

FIG. 9 is a flowchart illustrating another interpretation of a switch signal according to some inventive principles of this patent disclosure. In this embodiment, edges of a switch signal are used to determine the switch type. In 70 a first edge can be received. In 72 a timer is started. In 74, it is determined if a falling edge was received before the time expired. For example, the switch signals received at the controller 14 can be monitored for an edge. If a falling edge is received, the switch type is identified as a momentary switch in 76. If a falling edge is not received, the switch type is identified as a maintained switch in 78.

Although a falling edge and a rising edge have been described above, the opposite edges can be used. Moreover, any state change can be used. For example, in 70 a state change can be received. Similarly in 74, it is determined if another state change occurs within the time period. Accordingly a switch type can be determined regardless of whether the switch is a pull-up type, pull down type, multi-level type, or the like.

Such a technique of determining the switch type can be used in a variety of modes. For example, the techniques can be used during the learn mode described with reference to FIG. 8. In another example, the techniques can be used during an operation mode. Thus for each edge, state, or the like received in 70, the switch type can be determined in response to the next edge, state or the like and the load 16 can be controlled according to the determined switch type.

Moreover, the inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:
1. A system, comprising:
an input configured to receive a switch signal from a switch;

a controller coupled to the input and configured to determine a type of the switch in response to the switch signal and interpret the switch signal in response to the type of the switch; and wherein the controller is configured to control a load in response to the switch signal.

2. The system of claim 1, wherein the controller is further configured to control the load in response to the type of the interpreted switch signal.

3. The system of claim 1, wherein the controller is further configured to detect a state change of the switch signal and disregard any subsequent state change for a time period that can be used to determine the actions of a human operator.

4. The system of claim 3, further comprising:
an electrical switching device configured to control current to the load;
wherein the controller is further configured to actuate the electrical switching device in response to a detected state change that was not disregarded.

5. The system of claim 1, wherein the controller is configured to:
receive at least one state change in the switch signal during a learn mode; and
determine the type of the switch in response to the at least one state change received during the learn mode, wherein the switch comprises a momentary or maintained switch that can be actuated by a human operator.

6. The system of claim 1, wherein the controller is further configured to:
receive a first edge in the switch signal; and
determine a switch type in response to a second edge, if any, received during a time period that can be used to determine the actions of a human operator after the first edge.

7. The system of claim 1, wherein the controller is configured to disregard particular switch type patterns in the switch signal after determining the type of the switch.

8. The system of claim 1, wherein the controller is configured to control the load directly.

9. The system of claim 1, wherein the controller is configured to control the load through a control network.

10. A method, comprising:
sensing a switch type in response to a switch signal from a switch;
interpreting the switch signal in response to the switch type; and
controlling a load in response to the switch signal.

11. The method of claim 10, further comprising controlling a load in response to the switch signal and the switch type.

12. The method of claim 10, further comprising:
measuring a time period between the first state change in the switch signal and the second state change in the switch signal; and
determining the switch type in response to the time period that can be used to determine the actions of a human operator.

13. The method of claim 10, further comprising:
receiving a first state change in the switch signal;
monitoring the switch signal for a second state change;
if the second state change is received within a time period, characterizing the switch type as a momentary switch; and
if the second state change is not received within a time period, characterizing the switch type as a maintained switch.

14. The method of claim 10, further comprising:
entering a learn mode;
receiving the switch signal; and
determining the switch type in response to the switch signal, wherein the switch comprises a momentary or maintained switch that can be actuated by a human operator.

15. The method of claim 14, further comprising:
maintaining the switch type determined in the learn mode if switch signals are received indicating a different switch type.

16. The method of claim 14, further comprising:
changing the switch type determined in the learn mode if switch signals are received indicating a different switch type.

17. A method, comprising:
receiving a first state change in a switch signal;
disregarding a subsequent state change received within a time after receiving the first state change; and
interpreting the switch signal in response to the first state change without regard to the type of switch that generates the switch signal.

18. The method of claim 17, further comprising controlling a load in response to the first state change.

19. The method of claim 17, further comprising disregarding only one subsequent state change received within the time period after receiving the first state change.

20. The method of claim 17, further comprising disregarding all subsequent state changes received within the time period after receiving the first state change.

21. A system, comprising:
an input configured to receive a switch signal from a switch; and
a controller coupled to the input, and configured interpret the switch signal without regard to the type of switch that generates the switch signal by receiving a first state change of the switch signal and disregarding a subsequent state change of the switch signal.

22. The system of claim 21, wherein the controller is coupled to a load and configured to control the load in response to the first state change of the switch signal.

23. The system of claim 21, wherein the controller is configured to disregard only one subsequent state change within a time period after the corresponding first state change.

24. The system of claim 21, wherein the controller is configured to disregard any subsequent state change within a time period after the corresponding first state change.

* * * * *